US008125115B2

(12) United States Patent
Breden et al.

(10) Patent No.: US 8,125,115 B2
(45) Date of Patent: Feb. 28, 2012

(54) END TURN PHASE INSULATOR WITH A LEAD WIRE RESTRAINING TAB AND METHOD OF RESTRAINING LEAD WIRES ON DYNAMOELECTRIC DEVICES

(75) Inventors: Jeremy M. Breden, Bethalto, IL (US); Vincent P. Fargo, St. Charles, MO (US); Charles A. Peters, Bowling Green, KY (US)

(73) Assignee: Emerson Electric Co., Saint Louis, MO (US)

( * ) Notice: Subject to any disclaimer, the term of this patent is extended or adjusted under 35 U.S.C. 154(b) by 285 days.

(21) Appl. No.: 12/176,651

(22) Filed: Jul. 21, 2008

(65) Prior Publication Data
US 2010/0013349 A1 Jan. 21, 2010

(51) Int. Cl.
*H02K 3/34* (2006.01)
(52) U.S. Cl. ........................................ 310/215; 310/194
(58) Field of Classification Search .................. 310/194, 310/215, 206
See application file for complete search history.

(56) References Cited

U.S. PATENT DOCUMENTS

| 3,439,205 | A | * | 4/1969 | Houtman | 310/180 |
| 3,575,623 | A | | 4/1971 | Stine | |
| 4,250,419 | A | | 2/1981 | Zolman | |
| 4,328,438 | A | | 5/1982 | Zolman | |
| 4,403,162 | A | * | 9/1983 | Pallaro | 310/194 |
| 4,588,916 | A | | 5/1986 | Lis | |
| 6,043,584 | A | * | 3/2000 | DeHart | 310/260 |
| 6,170,974 | B1 | | 1/2001 | Hyypio | |
| 2005/0168097 | A1 | * | 8/2005 | Takizawa et al. | 310/215 |

* cited by examiner

*Primary Examiner* — Quyen Leung
*Assistant Examiner* — Leda Pham
(74) *Attorney, Agent, or Firm* — Harness, Dickey & Pierce, P.L.C.

(57) ABSTRACT

A stator comprises a core, a plurality of wire coils, an end turn phase insulator, and at least one lead wire. The wire coils are wound through the slots of the stator and form end turns as they wind from slot to slot. The end turn phase insulator comprises an end turn separating portion and a lead wire restraining tab. The end turn separating portion is sandwiched radially between an inner end turn and an outer end turn. The lead wire restraining tab extends from the end turn separating portion and is partially wrapped over the outer end turn in a manner sandwiching the lead wire between the lead wire restraining tab and the outer end turn. This prevents the lead wire from migrating into the core of the stator.

20 Claims, 3 Drawing Sheets

END TURN PHASE INSULATOR WITH A LEAD WIRE RESTRAINING TAB AND METHOD OF RESTRAINING LEAD WIRES ON DYNAMOELECTRIC DEVICES

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to dynamoelectric devices. More specifically, this invention pertains to an end turn phase insulator comprising a tab configured and adapted to prevent stator lead wires from migrating into a bore of a stator and to prevent the lead wires from migrating radially outward beyond one of the windings of the stator.

2. General Background Technology

Most dynamoelectric devices comprise lead wires extending from at least one axial end of the stator. Such lead wires are typically subjected to motion relative to the stator caused by the inertia of such leads interacting with vibrations or movement of the dynamoelectric devices. Over time, this can cause the lead wires to migrate relative to the stator. Due to the proximity of typical lead wires to the rotors of dynamoelectric devices, a common failure of dynamoelectric devices results from the lead wires migrating to the point where they make contact with the rotor or other moving parts in the stator bore, which can cause the device to short.

To reduce the occurrence of lead wire migration, prior art dynamoelectric devices often include some means of restraining or supporting the lead wires relative to the stator. For example, zip ties have been used to prevent or limit lead wire migration. However, zip ties are susceptible to breaking down in certain environments, such as when the dynamoelectric device is exposed to refrigerants or oils. As another example, U.S. Pat. No. 4,328,438 discloses a dynamoelectric device wherein a flap (27) is looped around an end turn and wrapped over the lead wires. Lacing is then used to sandwich the lead wires between the flap and the end turns of the windings of the stator. Although such a flap reduces the occurrence of lead wire migration, it does not have any positive stop means for limiting migration of the lead wires radially inwardly to the inner radial surface of the innermost winding. Additionally, such a flap is configured as part of a holder member that is separate from other components of the dynamoelectric device. Such separate components add to the cost, complicate the assembly process of dynamometric devices, and permit assembly without the component installed.

Another problem associated with lead wires is caused by the lead wires being positioned too close to the outer diameter of the stator windings. This creates a potential for interference with the housing shells or other components during the assembly or installation of the dynamoelectric devices.

SUMMARY OF THE INVENTION

The present invention overcomes the disadvantages associated with prior art solutions to lead wire migration. The present invention does this by incorporating a lead wire restraining tab as part of an end turn phase insulator. The tab is folded radially outward such that it wraps over the lead wires and is laced in such a position where it firmly holds the lead wires near the end turn phase insulator. Because the end turn phase insulator is positioned radially between separate wire coils, the tab serves as a means of ensuring that the lead wires cannot migrate radially into the core of the stator or interfere with the housing shell or other components during the assembly or installation of the dynamoelectric device. Additionally, because the tab is configured as part of a end turn insulator, the restraining tab does not appreciably increase production costs nor does it add any significant assembly steps.

In one exemplary aspect of the invention, a stator comprises a core, a plurality of wire coils, an end turn phase insulator, and at least one lead wire. The core has a plurality of slots that are circumferentially positioned about an axis. The axis defines radial and circumferential directions and opposite first and second axial ends of the stator. The wire coils are wound through the slots and form end turns as they wind from one of the slots to another of the slots. The end turn phase insulator comprises an end turn insulating portion and a lead wire restraining tab. The end turn insulating portion is sandwiched radially between at least two of the end turns. The at least two end turns are adjacent the first axial end of the stator and comprise an inner end turn and an outer end turn. The inner end turn is radially between the outer end turn and the axis. The lead wire restraining tab extends from the end turn insulating portion and from between the inner end turn and the outer end turn and is partially wrapped over the outer end turn. The lead wire extends between the lead wire restraining tab and the outer end turn.

In another aspect of the invention, a method of forming a stator of a dynamoelectric device comprises a step of obtaining a stator core. The core has a plurality of slots that are circumferentially positioned about an axis. The axis defines radial and circumferential directions and opposite first and second axial ends of the stator. The method further comprises winding wire through the slots of the stator core in a manner creating a plurality of wire coils that form end turns as the wire coils wind from one of the slots to another of the slots and in a manner creating a lead wire that extends from a first one of the wire coils. Additionally, the method comprises a step of obtaining an end turn phase insulator. The end turn phase insulator comprises an end turn insulating g portion and a lead wire restraining tab. The lead wire restraining tab extends from the end turn insulating portion. Still further, the method comprises sandwiching the end turn insulating portion of the end turn phase insulator radially between at least two of the end turns. The at least two end turns are adjacent the first axial end of the stator and comprise an inner end turn and an outer end turn. The inner end turn is radially between the outer end turn and the axis. Yet further, the method comprises encircling the at least two end turns with lacing in a manner wrapping the lead wire restraining tab at least partially over the outer end turn with the lead wire extending between the lead wire restraining tab and the outer end turn and in a manner holding the lead wire restraining tab away from the inner end turn.

In yet another aspect of the invention, an end turn phase insulator comprises a sheet of electrical insulation material. The sheet comprises first and second end turn insulating portions, at least two elongate connecting portions, and a lead wire restraining tab. The first and second end turn insulating portions are longitudinally spaced from each other. The elongate connecting members extend longitudinally from the first end turn insulating portion to the second end turn insulating g portion. The lead wire restraining tab extends from the first end turn insulating portion in manner such that the lead wire restraining tab defines a longitudinal end of the sheet. The first end turn insulating portion has a transverse width, as does the lead wire restraining tab. The transverse width of the lead wire restraining tab is less than the transverse width of the first end turn insulating portion.

Further features and advantages of the present invention, as well as the operation of various embodiments of the present invention, are described in detail below with reference to the accompanying drawings.

Figure 1:
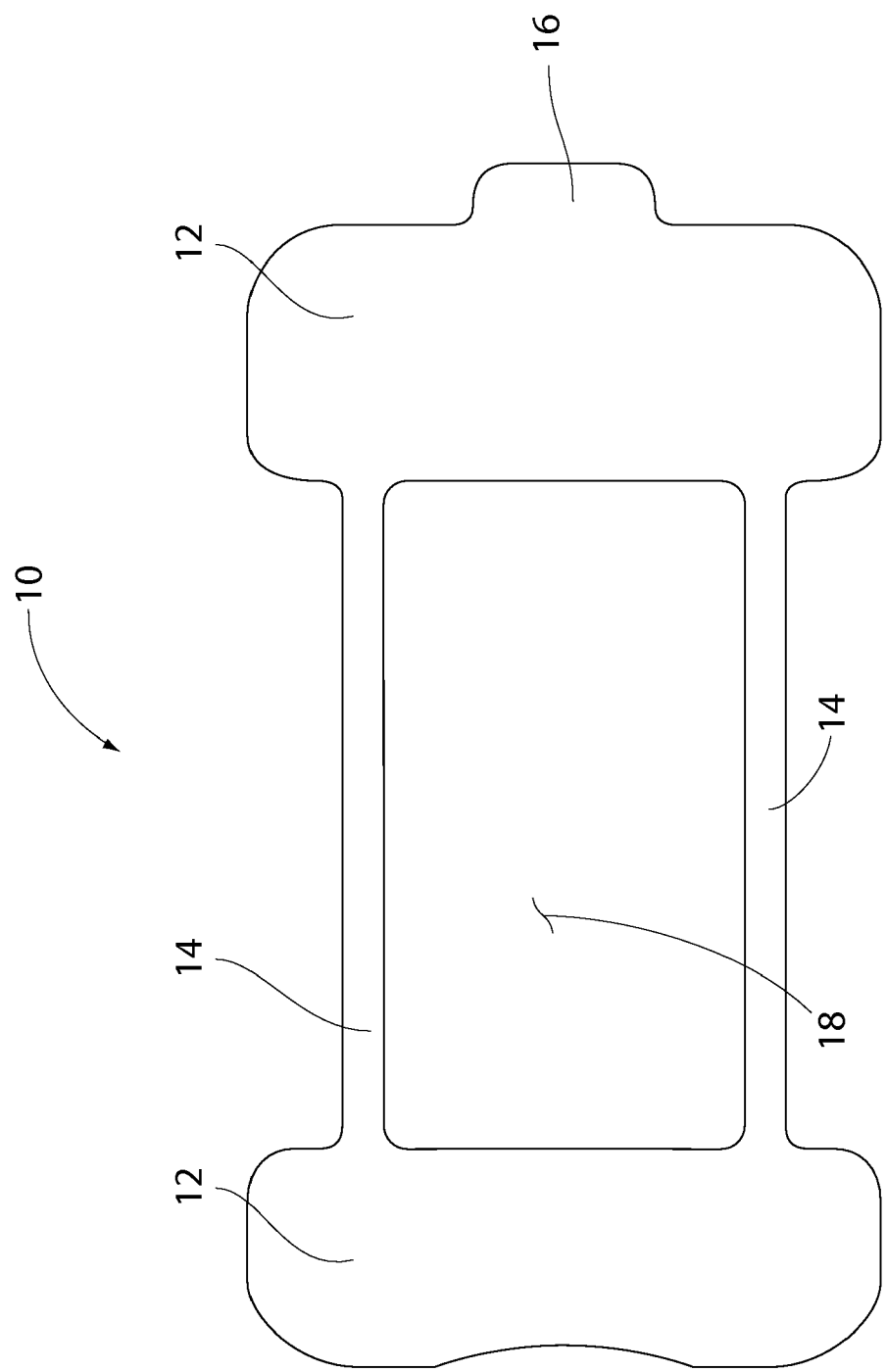
FIG. 1 is a plan view of one embodiment of an end turn phase insulator in accordance with the invention.

Reference numerals in the written specification and in the drawing figures indicate corresponding items.

DETAILED DESCRIPTION

An end turn phase insulator 10 in accordance with the invention is shown in FIG. 1. The end turn phase insulator 10 is formed out of a thin sheet of electrical insulating material, such as mylar. In the embodiment shown, the end turn phase insulator 10 comprises two longitudinally spaced end turn insulating portions 12, two elongate connecting portions 14, and a lead wire restraining tab 16.

The end turn insulating portions 12 and the two elongate connecting portions 14 are configured in manner similar to corresponding portions of prior art end turn phase insulators. The end turn insulating portions 12 of the end turn phase insulator 10 are generally rectangular in shape with rounded corners, although variations from this shape are contemplated as within the scope of embodiments of the invention. The elongate connecting portions 14 are parallel to each other and connect the end turn insulating portions 12 to each other. A rectangular opening 18 extends through the center of the end turn phase insulator 10 and has a perimeter bound by the end turn insulating portions 12 and the elongate connecting portions 14. As shown, the elongate connecting portions 14 are set-in from the widthwise edges of the end turn insulating portions 12.

The lead wire restraining tab 16 extends outwardly from one of the end turn insulating portions 12. The lead wire restraining tab 16 is significantly narrower in width than are the end turn insulating portions 12. The widthwise centerline of lead wire restraining tab 16 coincides with the widthwise centerline of the end turn insulating portions 12, although the restraining tab may be offset from the centerline of the end turn insulating portions without departing from the scope of embodiments of the invention. In the exemplary embodiment shown, therefore, it should be appreciated that the plan view of the back side of the end turn phase insulator 10 is identical to the plan view of its front side.

Figure 2:
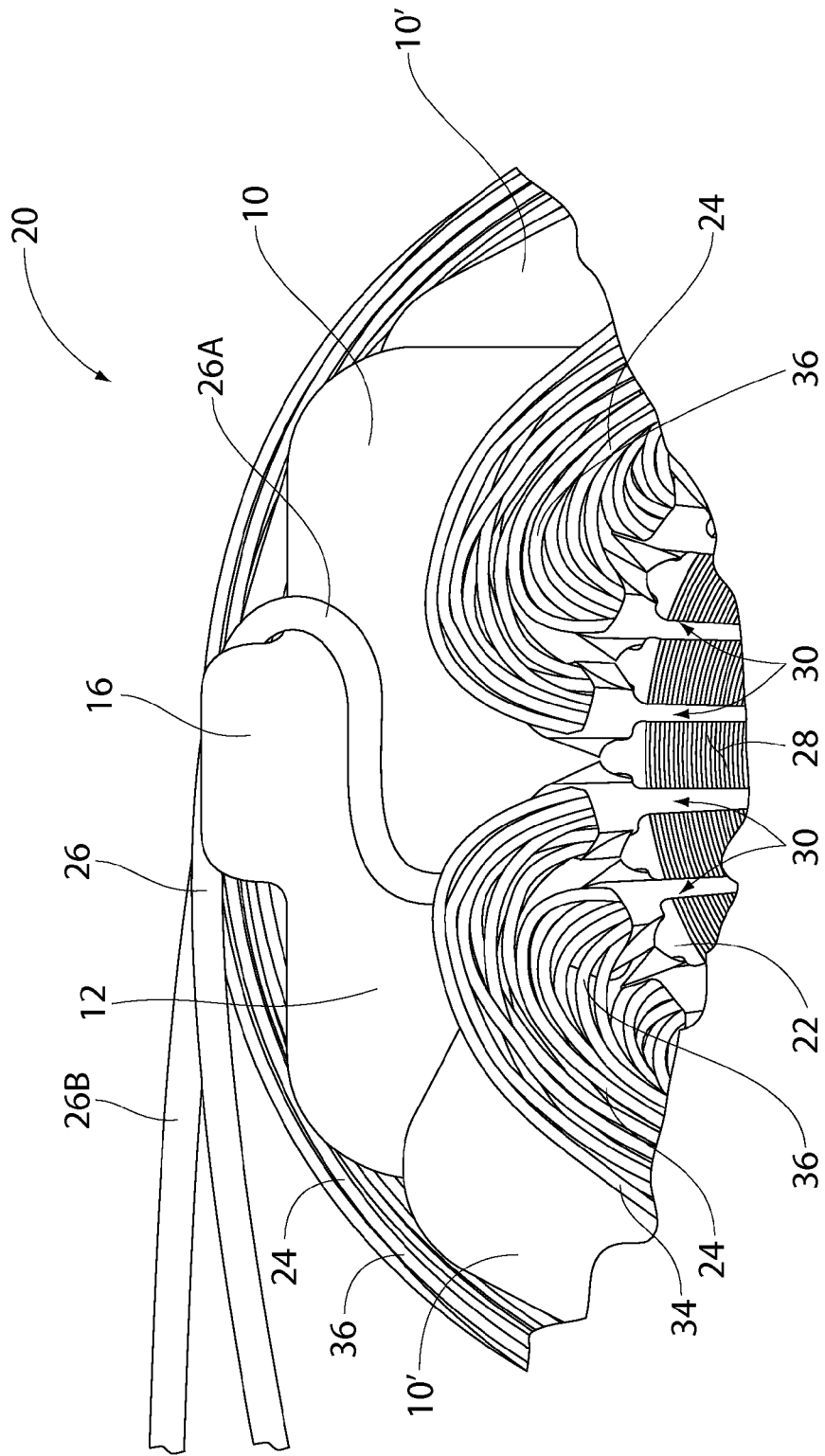
FIG. 2 is a perspective view depicting a portion of a stator that incorporates the end turn phase insulator shown in FIG. 1 and depicts an intermediate stage of the stator's assembly.
Figure 3:
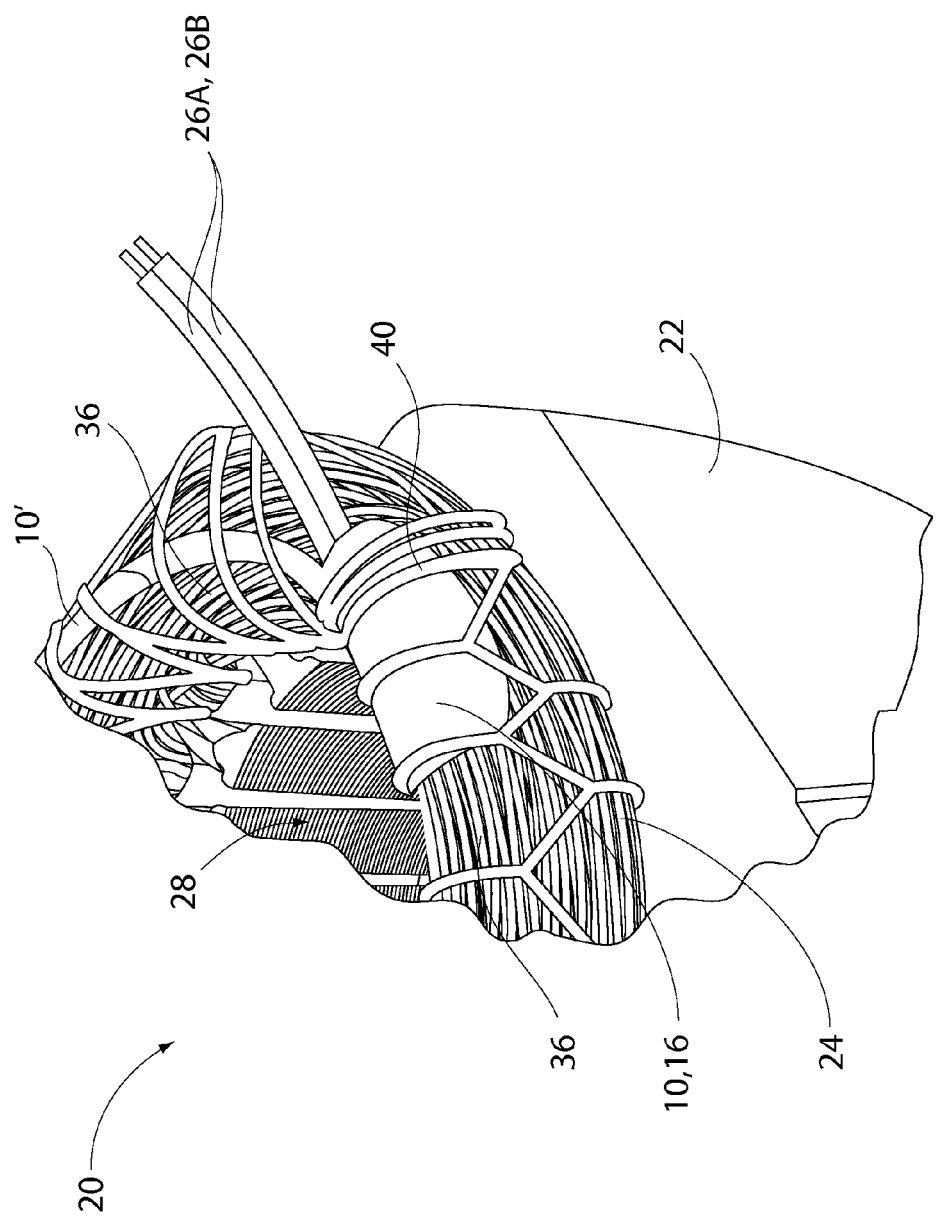
FIG. 3 is a perspective view depicting the stator shown in FIG. 2 after the windings of the stator have been laced.

The end turn phase insulator 10 is assembled to a stator in manner similar to the way conventional end turn phase insulators are assembled to stators. FIGS. 2 and 3 show an exemplary stator 20 comprising the end turn phase insulator 10 of FIG. 1. The stator 20 comprises a stator core 22, a plurality of windings 24, and lead wires 26. The stator core 22 is a typical core of the type that comprises a plurality of parallel slots 30 that are spaced circumferentially from each other about the center axis of the stator's bore 28. The slots extend radially outward into the stator core 22 from the bore 28.

Coils or windings 24 are added to the stator core 22 by repeatedly winding coated electrically conductive wire 34 through one of the slots 30 in a first axial direction and then back through another of the slots in the opposite axial direction. This creates a plurality of winding end turns 36 on each of the opposite axial ends of the stator 20.

After an initial ring of the windings 24 is created circumferentially around the center axis of the stator bore 28, the end turn phase insulator 10, and several other end turn insulators 10' that lack the lead wire restraining tab 16, are positioned on the assembly. This is done by inserting the elongate connecting portions 14 of the end turn phase insulator 10 in a pair of the slots 30. The end turn phase insulators 10, 10' are arranged such that the their end turn insulating portions 12 slightly overlap circumferentially, as shown in FIG. 2.

After assembling the end turn phase insulators 10, 10' to the stator core, another ring of the windings 24 is created circumferentially around the center axis in the same manner as described above. It should be appreciated that, following the formation of the windings, the leads wires 26 are left extending from one or more of the windings 24 on at least one of the axial ends of the stator 20 for the purpose of supplying electrical power to the windings. The lead wires 26 are each covered in an insulating sheath, as shown. The lead wire 26A shown extending from one of the inner windings 24 is wrapped around the lead wire restraining tab 16 of the end turn phase insulator 10 such that it extends from the winding generally in a first circumferential direction and thereafter turns about the lead wire restraining tab before continuing to extend generally in a second, opposite circumferential direction (see FIG. 2). Another one of the lead wires 26B extends from one of the outer windings 24 generally the second circumferential direction, and simply passes behind the restraining tab 16 of the end turn phase insulator 10.

With the lead wires 26 positioned as described above, lacing 40 is then secured to each end of the stator 20. The lacing 40 secures the windings 24 to each other so as to prevent the windings from rubbing against each other, which could wear the insulation coating on the wires. The lacing 40 is also used to secure lead wire restraining tab 16 of the end turn phase insulator 10 against the adjacent outer winding 24, with the lead wires 26 sandwiched therebetween. This secures the lead wires 26 in the position shown in FIG. 3 relative to the remainder of the stator 20. In this position, the lead wires 26 are neither radially interior of the windings 24 nor radially exterior thereto. As such, the lead wires 26 will not interfere with other dynamoelectric device components during assembly, such as when the stator 20 is slid into a housing shell, which may be a snug fit. Moreover, because the lead wire restraining tab 16 extends out from between the inner and outer windings 24, the lead wires 26 are prevented from migrating into the bore 28 of the stator 20. This ensures that the lead wires 26 will not contact the rotor or other moving parts in the bore 28 of the stator 20.

In view of the foregoing, it should be appreciated that the invention achieves the several advantages over prior art methods and prior art lead wire restraining devices. It should also be appreciated that multiple end turn phase insulators in accordance with the invention could be used to secure lead wires as they extend around the circumference of a stator. Still further, it should be appreciated that the invention provides for a means of securing the lead wires of a stator simply by modifying one or more of the end turn phase insulators and therefore does not add any appreciable cost to the fabrication of a dynamoelectric device nor does it add any significant assembly steps thereto.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of the embodiments of the invention, the terms "comprising," "including," and "having" are intended to be open-ended and mean that there may be additional elements other than the listed elements. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A dynamoelectric device comprising:
a stator, the stator comprising a core, a plurality of wire coils, an end turn phase insulator, and at least one lead wire, the core having a plurality of slots that are circumferentially positioned about an axis, the axis defining radial and circumferential directions and opposite first and second axial ends of the stator, the wire coils being wound through the slots and forming end turns as the wire coils wind from one of the slots to another of the slots, the end turn phase insulator comprising an end turn insulating portion and a lead wire restraining tab, the end turn insulating portion being sandwiched radially between at least two of the end turns, the at least two end turns being adjacent the first axial end of the stator and comprising an inner end turn and an outer end turn, the inner end turn being radially between the outer end turn and the axis, the lead wire restraining tab extending from the end turn insulating portion and from between the inner end turn and the outer end turn and being partially wrapped over the outer end turn, the lead wire extending between the lead wire restraining tab and the outer end turn, wherein the end turn insulating portion extends circumferentially about the axis a first arc length and the lead wire restraining tab extends circumferentially about the axis a second arc length, the second arc length is less than the first arc length, and wherein the inner end turn is formed by a first one of the wire coils, the end turn phase insulator has opposite faces, and the lead wire extends from the first wire coil in generally a first circumferential direction along one of the opposite faces of the end turn phase insulator and turns about the lead wire restraining tab in a manner such that the lead wire further extends therefrom in generally an opposite second circumferential direction along the other of the opposite faces of the end turn phase insulator.

2. A dynamoelectric device in accordance with claim 1 wherein the end turn insulating portion constitutes a first end turn insulating portion and the end turn phase insulator further comprises a second end turn insulating portion, the second end turn insulating portion is sandwiched between at least two other of the end turns relative to the axis, and the at least two other of the end turns are adjacent the second axial end of the stator.

3. A dynamoelectric device in accordance with claim 2 wherein the end turn phase insulator comprises two elongate connecting portions, the first end turn insulating portion is connected to the second end turn insulating portion via the two elongate connecting portions, one of the two elongate connecting portions is positioned within one of the slots of the stator, and the other of the two elongate connecting members is positioned in another one of the slots of the stator.

4. A dynamoelectric device in accordance with claim 1 wherein the lead wire constitutes a first lead wire, the stator comprises a second lead wire, the second lead wire extends from a second one of the wire coils, and the second lead wire extends in generally the second circumferential direction from the second wire coil and in generally the second circumferential direction along the other of the opposite faces of the end turn phase insulator in a manner such that the second lead wire extends between the lead wire restraining tab and the outer end turn.

5. A dynamoelectric device in accordance with claim 1 wherein the stator further comprises lacing, and the lacing encircles the at least two of the end turns in a manner pressing the lead wire restraining tab against the outer end turn.

6. A dynamoelectric device comprising:
a stator having an axis and opposite first and second axial ends, the stator comprising a plurality of wire coils forming end turns, the end turns including an inner end turn and an outer end turn adjacent the first axial end; an end turn phase insulator having opposite faces and including an end turn insulating portion and a lead wire restraining tab, the end turn insulating portion extending circumferentially about the axis between the inner and outer end turns a first arc length, the lead wire restraining tab extending from the end turn insulating portion and extending circumferentially about the axis a second arc length which is less than the first arc length; and at least one lead wire that extends from a first one of the wire coils generally in a first circumferential direction along one of the opposite faces of the end turn phase insulator and turns about the lead wire restraining tab in a manner such that the lead wire further extends therefrom in generally an opposite second circumferential direction along the other of the opposite faces of the end turn phase insulator.

7. The dynamoelectric device in accordance with claim 6 wherein the end turn insulating portion constitutes a first end turn insulating portion, the end turn phase insulator further including a second end turn insulating portion extending circumferentially about the axis between at least two other of the end turns adjacent the second axial end of the stator.

8. A dynamoelectric device in accordance with claim 7 wherein the stator includes a core having a plurality of slots, the end turn phase insulator includes at least one connecting portion, the first end turn insulating portion is connected to the second end turn insulating portion via the at least one connecting portion, and the at least one connecting portion is positioned in one of the stator core slots.

9. A dynamoelectric device in accordance with claim 6 wherein the lead wire constitutes a first lead wire, the stator comprises a second lead wire, the second lead wire extends from a second one of the wire coils, and the second lead wire extends in generally the second circumferential direction from the second wire coil and in generally the second circumferential direction along the other of the opposite faces of the end turn phase insulator in a manner such that the second lead wire extends between the lead wire restraining tab and the outer end turn.

10. A dynamoelectric device in accordance with claim 6 wherein the stator further comprises lacing securing the lead wire restraining tab against the outer end turn.

11. A dynamoelectric device comprising:
a stator having an axis and opposite first and second axial ends, the stator comprising: a plurality of wire coils forming end turns and having a lead wire extending from one of the wire coils, the end turns including an inner end turn and an outer end turn adjacent to the first axial end; and an end turn phase insulator having an end turn insulating portion and an integral lead wire restraining tab, the end turn insulating portion extending circumferentially about the axis between the inner and outer end turns, the integral lead wire restraining tab extending from the end turn insulating portion and wrapped radially outwardly over at least a portion of the outer end turn and said lead wire.

12. The dynamoelectric device in accordance with claim 11 wherein the end turn insulating portion constitutes a first end turn insulating portion, the end turn phase insulator further including a second end turn insulating portion extending circumferentially about the axis between at least two other of the end turns adjacent the second axial end of the stator.

13. A dynamoelectric device in accordance with claim 12 wherein the stator includes a core having a plurality of slots, the end turn phase insulator includes at least one connecting portion, the first end turn insulating portion is connected to the second end turn insulating portion via the at least one connecting portion, and the at least one connecting portion is positioned within a slot of the stator.

14. A dynamoelectric device in accordance with claim 11 wherein the stator further comprises lacing securing the integral lead wire restraining tab against the outer end turn.

15. A dynamoelectric device in accordance with claim 11 wherein the end turn insulating portion extends circumferentially about the axis a first arc length, and the integral lead wire restraining tab extends circumferentially about the axis a second arc length that is less than the first arc length.

16. A dynamoelectric device in accordance with claim 11 wherein the end turn phase insulator has opposite faces, the dynamoelectric device further comprising a lead wire that extends in generally a first circumferential direction along one of the opposite faces of the end turn phase insulator, and turns about the integral lead wire restraining tab in a manner such that the lead wire further extends therefrom in generally an opposite second circumferential direction along the other of the opposite faces of the end turn phase insulator.

17. A dynamoelectric device in accordance with claim 15 wherein the first and second arc lengths have coinciding centers.

18. A dynamoelectric device in accordance with claim 6 wherein the first and second arc lengths have coinciding centers.

19. A dynamoelectric device in accordance with claim 1 wherein the first and second arc lengths have coinciding centers.

20. A dynamoelectric device in accordance with claim 11 wherein the end turn phase insulator is formed from a single sheet of electrically insulative material.

* * * * *